No. 771,682. PATENTED OCT. 4, 1904.
L. SUSSMAN.
PIPE JOINT.
APPLICATION FILED MAR. 26, 1904.
NO MODEL.
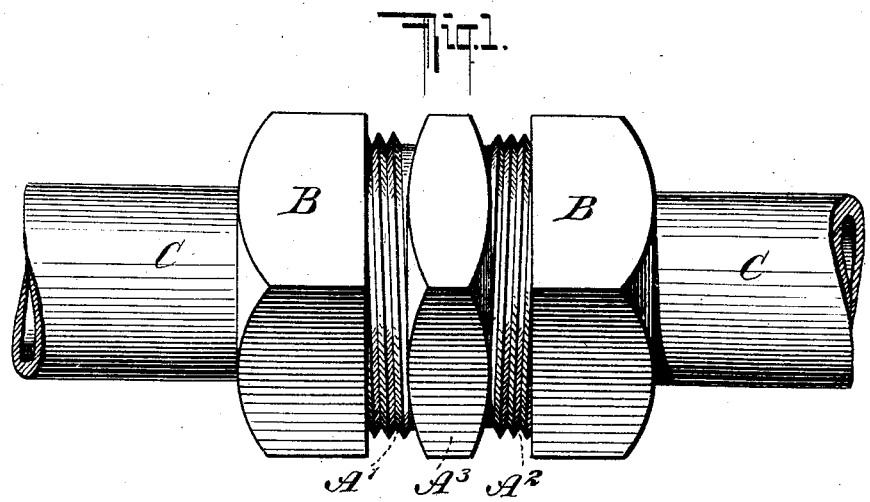
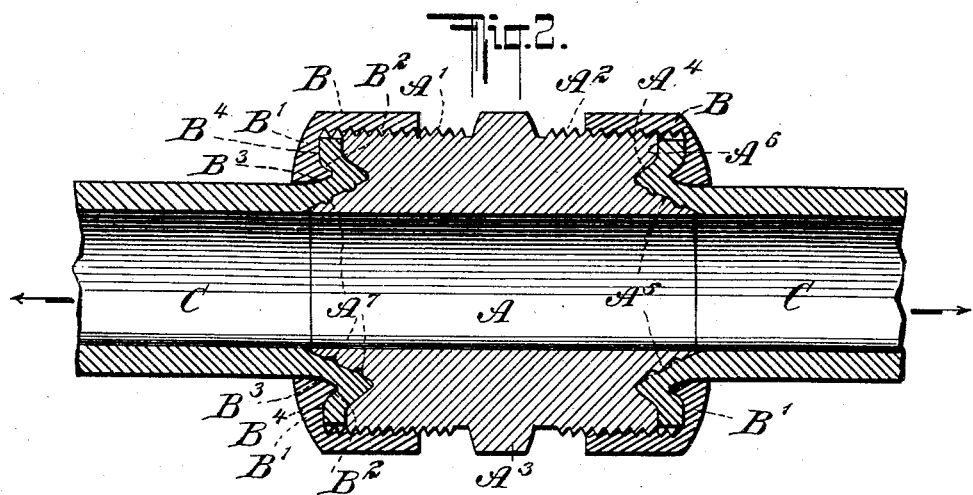
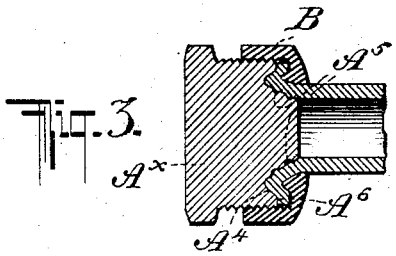

No. 771,682. Patented October 4, 1904.

UNITED STATES PATENT OFFICE.

LEON SUSSMAN, OF BAYONNE, NEW JERSEY.

PIPE-JOINT.

SPECIFICATION forming part of Letters Patent No. 771,682, dated October 4, 1904.

Application filed March 26, 1904. Serial No. 200,122. (No model.)

*To all whom it may concern:*

Be it known that I, LEON SUSSMAN, a citizen of the United States, and a resident of Bayonne, in the county of Hudson and State of New Jersey, have invented certain new and useful Improvements in Pipe-Joints, of which the following is a specification.

My invention relates to means for making tight joints in pipes either at the end of a pipe or at the connection of two or more pipes, and is more especially designed for repairing or stopping broken pipes, so as to prevent the fluid from escaping through the leak.

The invention will be fully described hereinafter and the features of novelty pointed out in the appended claims.

Reference is to be had to the accompanying drawings, in which—

Figure 1 is an outside view of one form of my improved joint. Fig. 2 is a longitudinal section of the same, and Fig. 3 is a longitudinal section of another form of my invention.

My improved pipe-closing or pipe-repairing means comprises an inner member and an outer member adapted to clamp the pipe end between them and provided with opposing inclined surfaces which flare toward the entrance end—that is, the end from which the pipe is inserted. At least the outer member is tubular.

As illustrated by Figs. 1 and 2, where two pipe ends are shown connected by my improved joint or union, the inner member $A$ has screw-threads $A'$ $A^2$ and a central polygonal portion $A^3$ on its outer surface and is formed at its ends with the inclined surface $A^4$ flaring toward the entrance of the pipe, as hereinbefore mentioned. In addition the inner member has at its ends tapering surfaces $A^5$ adjacent to the bore of said member and annular plane surfaces $A^6$ adjacent to the outer surface of the member. Thus the ends of the inner member are approximately V-shaped in longitudinal section, the inclined surfaces $A^4$ $A^5$ meeting at an acute angle. The ends of the inner member $A$ may be provided with circumferential or other grooves $A^7$, into which the pipe is pressed, as hereinafter set forth. The outer members $B$ are in the nature of nuts adapted to screw on the portions $A'$ $A^2$, respectively, and are each provided with an annular head $B'$, the inner surface of which has a flaring portion $B^2$, a converging portion $B^3$, and an annular plane portion $B^4$, these three portions being similar in location to the surfaces $A^4$, $A^5$, and $A^6$, respectively, of the inner member and parallel to said surfaces.

In the use of this device, say, for repairing a broken lead pipe the broken portion is cut so as to make two pipe portions $C$ with fairly clean edges. Then each pipe portion is forced lengthwise against one of the tapering surfaces $A^5$ of the inner member. This spreads the end of the pipe into about the form shown in Fig. 2, and by tightening the outer member or nut $B$ the flared end of the pipe is pressed tightly between the surfaces $A^4$ $A^5$ $A^6$ of the inner member and the corresponding surfaces $B^2$ $B^3$ $B^4$ of the outer member. Inasmuch as the surfaces $A^4$ $B^2$ widen or flare toward the entrance end, it will be obvious that the joint will efficiently resist any pull on the pipe in the direction of the arrows in Fig. 2. The V-shaped surfaces of the two members also contribute to prevent the pipe portions from being pulled out. The bore of the inner member may be equal to that of the pipe, so as to have an unobstructed flow of water or other fluid. The provision of the grooves $A^7$ helps to produce a tight joint by forcing the soft metal into the grooves by the clamping pressure of the two members.

Fig. 3 shows the use of my invention for closing the end of a pipe. The outer member $B$ is in this case exactly the same as in Figs. 1 and 2, and the inner member $A^\times$ has a flaring surface $A^4$, a tapering surface $A^5$, and a plane surface $A^6$, just as described with reference to Figs. 1 and 2, but instead of being tubular the inner member is solid or closed in this case, so as to form a plug. The two members in this form of my invention will expand the end of the pipe $C$ and clamp the expanded end in the same manner as described with reference to Figs. 1 and 2.

Various modifications may be made without departing from the nature of my invention.

I claim as my invention—

1. In a device of the character described an inner member provided at one end with a clamping-surface tapering toward said end, another clamping-surface surrounding the first-named clamping-surface and flaring toward said end, a third, plane clamping-surface surrounding the said flaring surface, in combination with an outer member adjustably connected with said inner member and having clamping-surfaces corresponding to those of the inner member.

2. In a device of the character described an inner member provided at its end with an annular groove V-shaped when viewed in longitudinal section of said member, in combination with an outer member adjustably connected with said inner member and provided with a head having a V-shaped annular rib projected toward said annular groove.

In witness whereof I have hereunto set my hand in the presence of two subscribing witnesses.

LEON SUSSMAN.

Witnesses:
   JOHN LOTKA,
   JOHN A. KEHLENBECK.